(12) United States Patent
Bharadwaj

(10) Patent No.: US 11,009,921 B1
(45) Date of Patent: May 18, 2021

(54) ELECTRONIC DEVICES WITH ADJUSTABLE HINGES

(71) Applicant: Apple Inc., Cupertino, CA (US)

(72) Inventor: Shravan Bharadwaj, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/874,565

(22) Filed: May 14, 2020

(51) Int. Cl.
*G06F 1/16* (2006.01)
*G09F 9/30* (2006.01)

(52) U.S. Cl.
CPC .......... *G06F 1/1681* (2013.01); *G06F 1/1652* (2013.01); *G06F 1/1662* (2013.01); *G09F 9/301* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,771,540 A * | 6/1998 | Carpenter | ............. | G06F 1/1616 16/299 |
| 6,101,676 A * | 8/2000 | Wahl | ...................... | E05D 11/082 16/340 |
| 6,233,138 B1 * | 5/2001 | Osgood | ................. | G06F 1/1616 248/920 |
| 6,304,433 B2 * | 10/2001 | O'Neal | ................. | G06F 1/1616 16/334 |
| 6,532,147 B1 * | 3/2003 | Christ, Jr. | ............. | G06F 1/1615 248/917 |
| 7,196,688 B2 | 3/2007 | Schena | | |
| 7,758,121 B2 | 7/2010 | Browne et al. | | |
| 7,967,367 B2 | 6/2011 | Cafeo et al. | | |
| 9,563,236 B2 * | 2/2017 | Rittenhouse | .......... | G06F 1/1618 |
| 9,840,861 B1 * | 12/2017 | Maatta | ...................... | E05D 1/00 |
| 10,001,810 B2 | 6/2018 | Yoo et al. | | |
| 10,642,318 B1 * | 5/2020 | Lehmann | ............... | G06F 1/1681 |
| 2001/0010621 A1 * | 8/2001 | O'Neal | .................. | G06F 1/1616 361/679.27 |
| 2008/0203760 A1 | 8/2008 | Cafeo et al. | | |
| 2018/0011515 A1 | 1/2018 | Yoo et al. | | |
| 2019/0211600 A1 | 7/2019 | Määttä | | |
| 2021/0064096 A1 * | 3/2021 | Channaiah | ............ | E05D 11/105 |

* cited by examiner

*Primary Examiner* — Lisa Lea-Edmonds
(74) *Attorney, Agent, or Firm* — Treyz Law Group, P.C.; G. Victor Treyz

(57) ABSTRACT

An electronic device may have a housing with first and second portions that move relative to each other. The housing may have a hinge that is configured to bend about a hinge axis. Control circuitry in the electronic device may adjust an electrically adjustable device to control resistance of the hinge to bending about the hinge axis. The electrically adjustable device may be an electroactive polymer that that adjusts pressure between two sliding layers of material, may be a magnetorheological device, may be an adjustable component formed from a shape memory material, or may be another electrically adjustable device. One or more sensors in the electronic device may gather sensor data such as touch input, force input, input related to movement of the housing, housing position information, and/or other data. During operation, the control circuitry can adjust the resistance of the hinge to bending based on the sensor data.

20 Claims, 13 Drawing Sheets

ELECTRONIC DEVICES WITH ADJUSTABLE HINGES

FIELD

This relates generally to electronic devices, and, more particularly, to housings for electronic devices.

BACKGROUND

Electronic devices have housings in which displays and other components are mounted. Electronic device housings may have portions that move relative to each other such as portions that rotate relative to each other about a hinge axis.

SUMMARY

An electronic device may have a housing with portions that move relative to each other. Displays, keyboards, and other components may be supported by the housing. For example, one portion of a housing may support a display and another portion of the housing may support a keyboard and trackpad. In another illustrative configuration, a housing may have first and second portions that removably couple to first and second respective devices. Arrangements may also be used in which one portion of a housing serves as a base and another portion of the housing with a display moves linearly relative to the base.

The housing may have a hinge that is configured to bend about a hinge axis. The hinge may have layers of material that are shared with housing wall structures in first and second portions of the housing. These layers of material may bend as the first and second portions of rotate relative to each other about the hinge axis.

Control circuitry in the electronic device may adjust an electrically adjustable device to control resistance of the hinge to bending about the hinge axis. The electrically adjustable device may be an electroactive polymer layer that that adjusts pressure between two sliding layers of material and thereby adjusts sliding friction between the two layers, may be a magnetorheological device with an adjustable stiffness, may be an adjustable component formed from a shape memory material, or may be any other electrically adjustable device.

One or more sensors in the electronic device may gather information such as user touch input, force measurements, measurements related to movement of the housing, information on the position of the housing, and/or other information. During operation, the control circuitry can adjust the resistance of the hinge to bending based on this data from the sensor. For example, the control circuitry can dynamically adjust hinge resistance to implement a soft-close feature for the housing, to lock and unlock the housing, to hold housing portions in desired positions relative to each other, and/or to perform other functions related to bending of the hinge or other movements within a device.

DETAILED DESCRIPTION

An electronic device may have a housing in which a display and other components are mounted. The housing may have portions that move relative to each other. For example, first and second housing portions may rotate relative to each other, may slide relative to each other, and/or may otherwise be moved into different positions with respect to each other. To control movement of housing structures and other structures in an electronic device, the electronic device may be provided with adjustable hinge structures and/or other electrically adjustable structures. In some embodiments, electrically adjustable components such as electrically adjustable clutches may be used to control the amount of rotational force, bending force, or other force used to rotate, bend, slide, and/or otherwise move structures relative to each other. As an example, an electronic device may be provided with a hinge clutch that can be adjusted to vary friction as the hinge is opened and closed.

Figure 1:
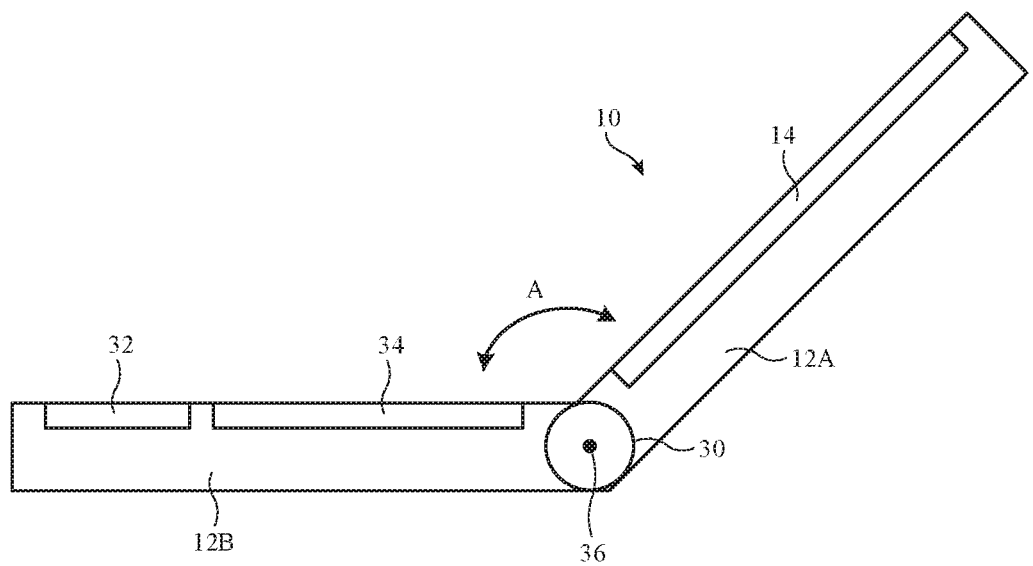
FIG. 1 is a side view of an illustrative electronic device in accordance with an embodiment.

A side view of an illustrative electronic device of the type that may include an electrically adjustable hinge or other electrically adjustable structure is shown in FIG. 1. Device 10 may be a laptop computer, a computer monitor containing an embedded computer, a tablet computer, a desktop computer, a cellular telephone, a media player, or other handheld or portable electronic device, a smaller device such as a wristwatch device, a wristband device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a navigation device, an embedded system such as a system in which equipment is mounted in a kiosk, in an automobile, airplane, or other vehicle, a removable external case for electronic equipment, an accessory such as a remote control, computer mouse, track pad, wireless or wired keyboard, or other accessory, and/or equipment that implements the functionality of two or more of these devices. In the illustrative configuration of FIG. 1, device 10 is a foldable device such as a laptop computer. Other types of device may be provided with electrically adjustable components such as electrically adjustable hinges and/or electrically adjustable clutches. The configuration of FIG. 1 is presented as an example.

As shown in FIG. 1, device 10 may have a housing such as housing 12. Housing 12 may be formed from materials such as polymer, glass, metal, crystalline materials such as sapphire, ceramic, fabric, foam, wood, other materials, and/or combinations of these materials. Device 10 may have any suitable shape. In the example of FIG. 1, housing 12 has upper portion 12A and lower portion 12B, which are coupled using bendable hinge structures such as hinge 30 to allow bending of housing 12 about hinge axis 36. The portions of housing 12 that overlap hinge axis 36 (e.g., upper and lower housing walls) may be formed as integral portions of hinge 30. For example, a flexible layer of fabric, glass, polymer, metal, etc. may form a housing wall that is shared between portion 12A, portion 12B, and hinge 30. Such shared housing walls may be formed on opposing sides of device 10 (as an example). Hinge 30 may also include one or more internal layers (e.g., layers that slide relative to each other, electrically adjustable layers, etc.).

A display such as display 14 may be mounted in upper portion 12A and input-output devices such as trackpad 32 and/or keyboard 34 may be mounted in lower portion 12B. During operation, a user may open and close device 10 by rotating upper portion 12A relative to lower portion 12B about hinge axis 36 (sometimes referred to as a bend axis, folding axis, rotational axis, etc.).

Upper portion 12A, which may sometimes be referred to as a lid, may be closed by rotating upper portion 12A into a position on top of lower portion 12B. In this position, device 10 is closed (e.g., the lid of device 10 is closed) and the orientation of portion 12A relative to portion 12B (e.g., angle A of FIG. 1) is 0°. When it is desired to use device 10, a user may open device 10 by rotating portion 12A clockwise about axis 36 until angle A has a value of 90-180° (e.g., a value of 105-135°) or other suitable non-zero angle. This allows the user to view content on display 14 and allows the user to supply input to input-output devices such as trackpad 32 and keyboard 34.

Figure 2:
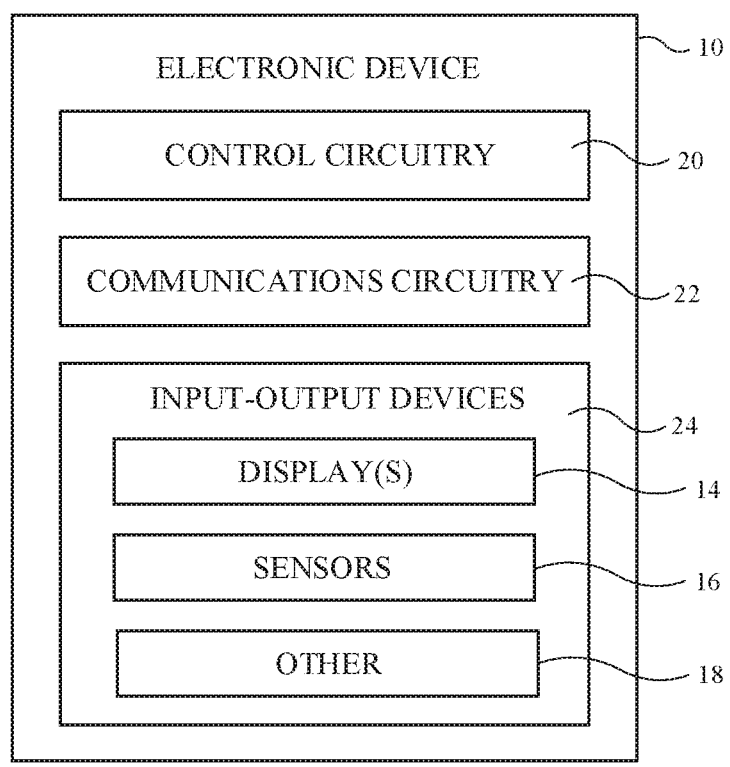
FIG. 2 is a schematic diagram of an illustrative electronic device in accordance with an embodiment.

A schematic diagram of an illustrative electronic device such as device 10 of FIG. 1 is shown in FIG. 2. Device 10 of FIG. 2 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections) and/or may be used to receive such information from external electronic devices. Each of these external devices may include components of the type shown by device 10 of FIG. 2.

As shown in FIG. 2, electronic device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid-state drive), volatile memory (e.g., static or dynamic random-access-memory), etc. Processing circuitry in control circuitry 20 may be used to gather input from sensors (e.g., cameras) and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output. Control circuitry 20 may also gather data (e.g., sensor data) and can control electrical components in device 10 accordingly.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 5 GHz and 10 GHz, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Electronic components such as input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors (e.g., cameras such as cameras on front face F and/or rear face R of device 10), fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, three-dimensional camera systems such as depth sensors (e.g., structured light sensors and/or depth sensors based on stereo imaging devices that capture three-dimensional images) and/or optical sensors such as self-mixing sensors and light detection and ranging (lidar) sensors that gather time-of-flight measurements (e.g., time-of-flight cameras), humidity sensors, moisture sensors, gaze tracking sensors, electromyography sensors to sense muscle activation, facial sensors, interferometric sensors, time-of-flight sensors, magnetic sensors, resistive sensors, distance sensors, angle sensors, force sensors such as force sensors that detect rotational force, and/or other sensors. In some arrangements, device 10 may use sensors 16 and/or other input-output devices 24 to gather user input. For example, input-output devices 24 such as buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

Input-output devices 24 may include optical components such as camera(s), depth sensors (e.g., structured light sensors or other sensors that gather three-dimensional image data), optical proximity sensors, ambient light sensors (e.g., color ambient light sensors), optical time-of-flight sensors (cameras) and other sensors 16 that are sensitive to visible and/or infrared light and that may emit visible and/or infrared light (e.g., devices 24 may contain optical sensors that emit and/or detect light). For example, a visible-light image sensor in a camera may have a visible light flash or an associated infrared flood illuminator to provide illumination while the image sensor captures a two-dimensional and/or three-dimensional image. An infrared camera such as an infrared structured light camera that captures three-dimensional infrared images may have an infrared flood illuminator that emits infrared flood illumination and/or may have a dot projector the emits an array of infrared light beams. Infrared proximity sensors may emit infrared light and detect the infrared light after the infrared light has reflected from a target object.

If desired, electronic device 10 may include additional components (see, e.g., other devices 18 in input-output devices 24). The additional components may include haptic output devices, actuators for moving movable structures in device 10, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 3:
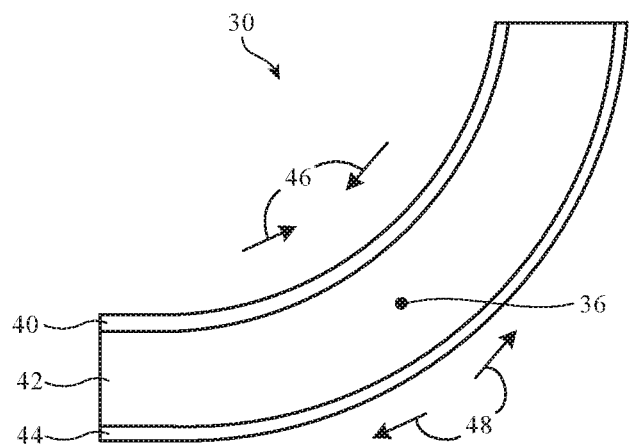
FIGS. 3 and 4 are cross-sectional side views of illustrative hinge structures in accordance with embodiments.

Device 10 may have a hinge (e.g., hinge 30 of FIG. 1) that is formed from structures that rotate relative to each other (e.g., a shaft and a surrounding member with an opening that receives the shaft for rotational motion). In some configurations, hinge 30 may include bendable layers of material. Consider, as an example, the illustrative hinge configuration of hinge 30 of FIG. 3. As shown in FIG. 3, hinge 30 may have an inner layer (sometimes referred to as a core layer) such as inner layer 42. Layer 42 may be formed from a carbon-fiber reinforced bendable layer (e.g., a layer of polymer containing carbon fibers), other fiber-composite materials (e.g., bendable fiberglass-reinforced polymer, etc.), a polymer layer without embedded fibers, a fabric layer, a metal layer, one or more other flexible layers, and/or combinations of two or more of these layers. Layer 42 of FIG. 3 is sandwiched between upper layer 40 and lower layer 44. Layers 40 and/or 44 may be formed from metal or other suitable materials (e.g., polymer, fabric, fiber-composite material, other materials and/or combinations of two or more of these materials, etc.). One or more additional layers may be included in hinge 30 if desired. For example, in an arrangement in which layers 40 and 44 are formed from flexible sheets of material (polymer, metal, fiber-composite material, etc.), an additional outer fabric layer or other bendable layer may be added to the exterior surfaces of hinge 30. To create a unified appearance for device 10, some or all of the layers in hinge 30 may extend throughout housing 12. For example, housing 12 may have one or more shared housing walls that are shared among portions 12A, 12B, and hinge 30 (e.g. a common housing wall may extend across portion 12A, hinge 30, and portion 12B to provide housing 12 with a uniform appearance). The layers in hinge 30 may be mounted within these flexible housing walls (e.g., walls in housing 12). If desired, hinge 30 may be mounted in an area of device 10 where some or all of the walls of housing 12 and/or other layers have been selectively omitted and/or provided with flexibility-enhancement openings to enhance flexibility. Hinge 30 may have the same structure all along hinge axis 36 or hinge 30 may have different configurations at different locations along the length of axis 36. As an example, portions of hinge 30 may have members with fully or partially surrounding circular openings that receive a cylindrical hinge shaft aligned with axis 36 and other portions of hinge 30 that are located at different positions along the length of axis 36 may have flexible layers or other hinge structures that operate by flexing (bending) as housing portions 12A and 12B are rotated relative to each other.

When hinge structures such as hinge 30 of FIG. 3 are bent about hinge axis 36, some portions of hinge 30 (e.g., portions of layer 40 that overlap hinge axis 36) may be in compression (experiencing force in directions 46), whereas other portion of hinge 30 (e.g., opposing portions of layer 44) may be in tension (experiencing force in directions 48).

Figure 4:
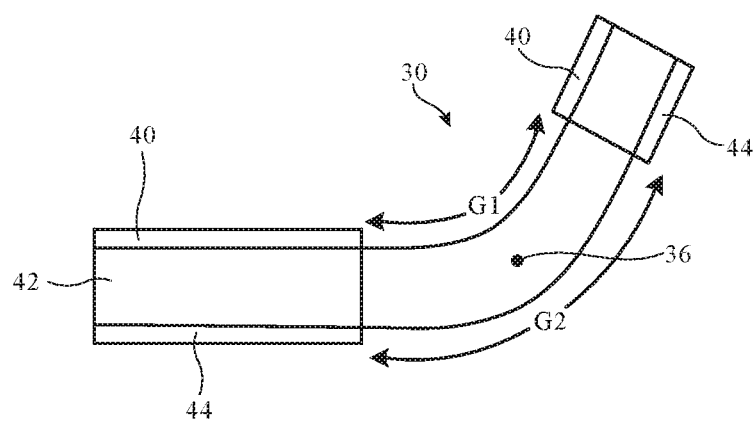

FIG. 4 shows how portions of layers 40 and 44 (which may sometimes be referred to as cladding layers, flexible layers, housing wall layers, etc.) may be selectively removed in the vicinity of hinge 30. There may be, for example, gaps G1 and G2 between adjacent portions of layer 40 and adjacent portions of layer 44, respectively. By selectively omitting portions of layers 40 and/or 44 that overlap hinge axis 36 and thereby reducing the thickness and/or stiffness of hinge structures 30 at axis 36, the bendability of hinge 30 and housing 12 about axis 36 may be enhanced.

Figure 5:
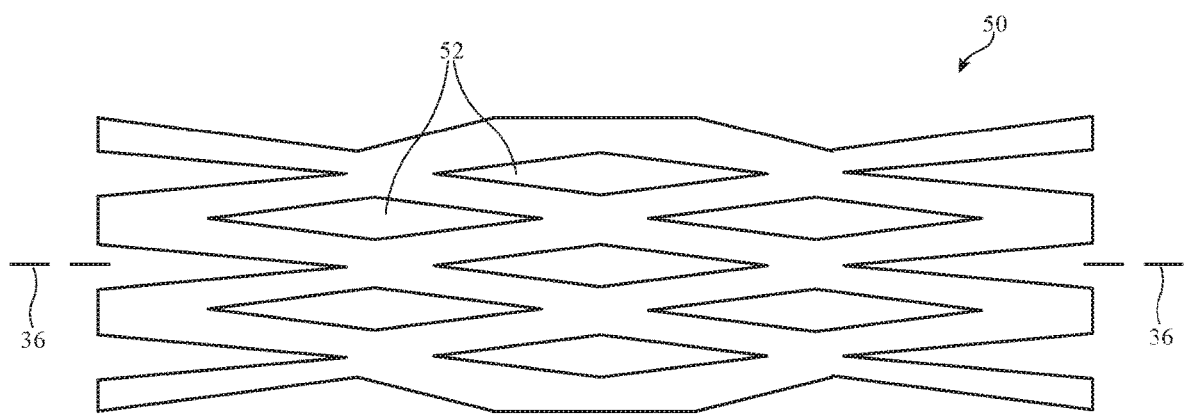
FIG. 5 is a top view of an illustrative hinge layer with flexibility-enhancement openings to promote bending about a hinge axis in accordance with an embodiment.

Flexibility may also be enhanced (e.g., locally in portions of hinge 30 that overlap axis 36) by providing one or more of the layers of hinge 30 (e.g., layers such as layers 40, 42, and/or 44 of FIGS. 3 and 4) with openings. Consider, as an example, hinge layer 50 of FIG. 5. Hinge layer 50 may be formed from a sheet of metal, polymer, and/or other materials. Flexibility-enhancement openings 52 in hinge layer 50 may have the shape of slots that are elongated parallel to hinge axis 36. The presence of openings 52 may help enhance the ability of layer 50 to bend about hinge axis 36 without experiencing undesired amounts of stress. One or more of the layers of hinge 30 (e.g., portions of one or more of these layers that overlap hinge axis 36) may be provided with this type of enhanced-flexibility arrangement.

Hinge 30 or other structures in device 10 that include layers and/or other members that move relative to each other may be provided with electrically adjustable components. For example, hinge 30 may be provided with an electrically adjustable component that serves as an electrically adjustable friction clutch that can be used to regulate the mechanical attributes of hinge 30 and therefore can be used to regulate the resistance to bending of hinge 30 and the associated resistance to rotation between housing portions 12A and 12B in device 10.

Figure 6:
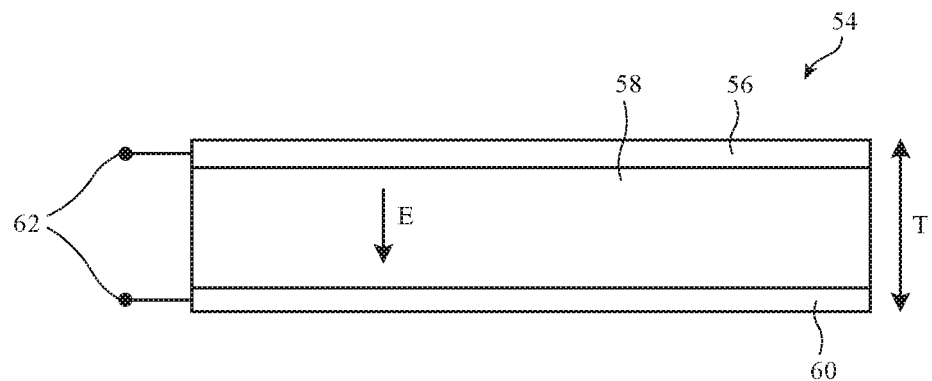
FIG. 6 is a cross-sectional side view of an illustrative electrically controlled component such as an electroactive polymer actuator in accordance with an embodiment
Figure 7:
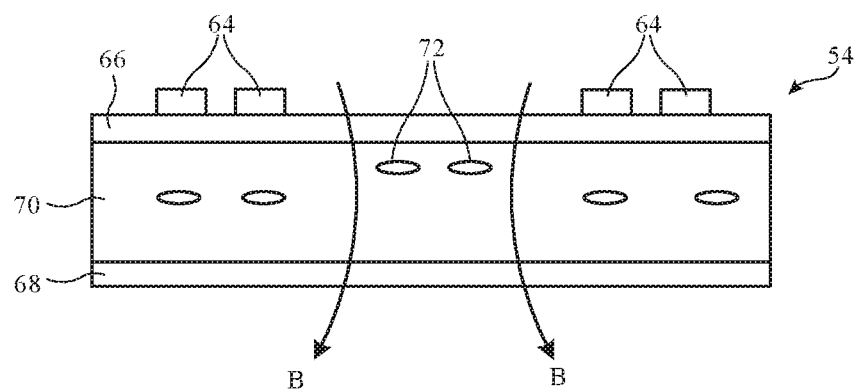
FIG. 7 is a cross-sectional side view of an illustrative electrically controlled component such as a magnetorheological device having a stiffness or other property that is adjusted by adjusting an applied magnetic field in accordance with an embodiment.
Figure 8:
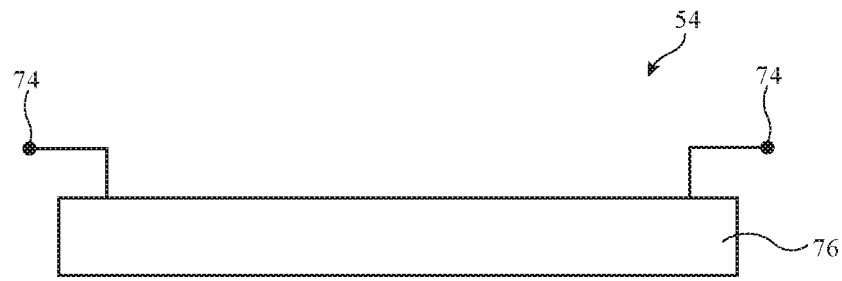
FIG. 8 is a cross-sectional side view of an illustrative electrically controlled component such as a shape memory device formed from shape memory material in accordance with an embodiment.

FIGS. 6, 7, and 8 show illustrative electrically adjustable components that may be used in forming clutches and/or other adjustable structures (e.g., structures that create movement, adjust material properties such as stiffness and/or bendability, structures that adjust the shape and/or location of elements in hinge 30 and/or other portions of device 10, etc.).

In the example of FIG. 6, electrically adjustable component 54 has terminals 62 that receive control signals (e.g., voltages) from control circuitry 20. Electrodes such as electrodes 56 and 60 or adjacent electrodes on a common substrate may be used in applying an electric field E to layer 58. Layer 58 may be formed from an electroactive polymer or other material that changes properties (e.g. size and/or shape) in response to the applied electric field. By adjusting the magnitude of the signal applied across terminals 62, for example, the thickness T of layer 58 may be adjusted. Layers in hinge 30 with adjustable thickness may sometimes be referred to as adjustable-thickness layers.

Another illustrative electrically adjustable component is shown in FIG. 7. In the example of FIG. 7, device 54 is an electrically adjustable magnetorheological device. Magnetorheological material 70 contains magnetic particles 72 embedded in a polymer, gel, fluid, or other material. During operation, the viscosity of material 70 and therefore the overall stiffness of device 54 may be adjusted by control circuitry 20 by using control circuitry 20 to control the magnitude of magnetic field B that is passing through material 70. In the example of FIG. 7, a layer of material 70 is sandwiched between first layer 66 and second layer 68. Metal traces 64 may be configured to form a coil (inductor) that produces magnetic field B in proportion to applied current from circuitry 20. Layers 66 and 68 may be, for example, dielectric layers such as flexible polymer layers.

In the example of FIG. 8, electrically adjustable device 54 has a layer of shape memory material 76 (e.g., sheet of shape memory polymer, a sheet of shape memory metal, etc.). By applying signals through layer 76, the shape and size of layer 76 may be controlled.

Other electrically adjustable devices 54 may be used in device 10, if desired (e.g. devices 54 may include electromagnetically adjusted devices such as linear actuators, motors, etc., devices 54 may include thermally-adjusted devices, devices 54 may include piezoelectric crystal devices, and/or devices 54 may include other structures that can exhibit adjustable properties).

The properties of devices 54 that can be adjusted by control circuitry 20 may include stiffness, size (e.g., thickness, length, width, other dimensions), temperature, shape, etc. These properties may be used to create adjustable clutches, actuators that move the positions of structures, structures that vary linear and/or rotational friction, and/or other adjustable devices. Hinge 30 may, as an example, be provided with one or more adjustable devices 54 so that the amount of rotational force required to open and/or close device 10 of FIG. 1 (e.g., the amount of force that a user needs to apply to housing 12 to adjust angle A of FIG. 1) may be adjusted.

Figure 9:
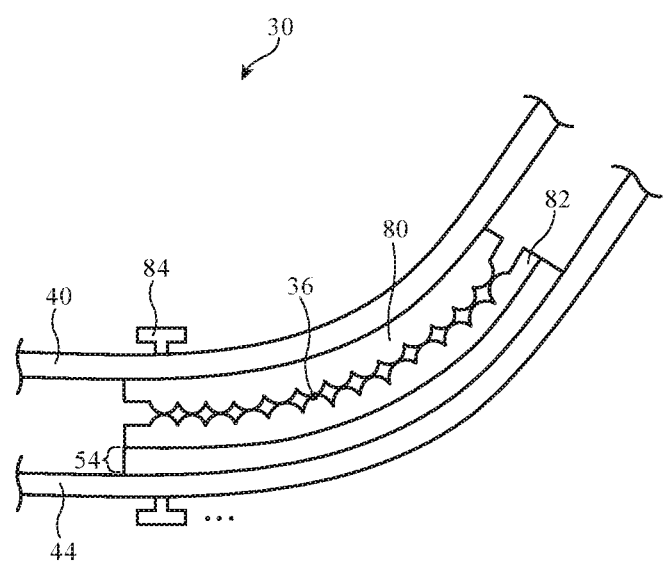
FIG. 9 is a cross-sectional side view of an illustrative hinge with an electrically adjusted device that serves as an electrically adjusted clutch in accordance with an embodiment.

Consider, as an example, the adjustable hinge arrangement of FIG. 9. Hinge 30 may have an electrically adjustable device 54 such as device 54 of FIG. 6 or other device that can be used to adjust thickness T. Flexible plates 80 and 82 have opposing surfaces with ridges that extend parallel to hinge axis 36, may have texture that provides sliding friction between plates 80 and 82, may have other surface features, and/or may have smooth surfaces. During bending of hinge 30, plates 80 and 82 may slide relative to each other.

Flexible plate 80 may be coupled to flexible layer 40 (e.g., using adhesive, welds, fasteners, and/or other attachment structures). Attachment structures such as these may also be used to attach device 54 to the inner surface of layer 44 and to attach plate 82 to device 54. Retention structures such as bolt 84 may pass through slots in the layers of hinge 30 and may be used to hold these layers together and maintain a desired maximum thickness of hinge 30 that helps to ensure that plates 80 and 82 do not separate.

During operation, control circuitry 20 may control the thickness T of device 54 and therefore adjust the force with which a flexible layer such as plate 82 bears against a flexible layer such as plate 80 (and the pressure with which plate 80 bears against plate 82). When plate 82 bears against plate 82 lightly or not at all, plates 80 and 82 may slide past each other easily, thereby allowing hinge 30 to bend freely about axis 36. When plate 82 bears against plate 80 forcefully, plates 80 and 82 experience more sliding friction, which increases the amount of rotational force required to bend hinge 30.

When high amounts of force are applied between plates 80 and 82, hinge 30 may effectively be locked in place to prevent further bending. By locking hinge 30, the position of housing portion 12A relative to housing portion 12B may be locked. For example, hinge 30 may be locked to hold display 14 at a desired angle A such as an angle of 120° during use by a user, even when external forces are being applied to housing 12 that tend to open or close housing 12. Hinge 30 may also be locked to retain housing portion 12A against housing portion 12B (e.g., to hold housing 12 in its closed configuration in which angel A is 0°). When not locked, hinge 30 can exhibit relatively low friction and resistance to rotation (e.g., hinge 30 may be unlocked when desired for easy opening and/or closing of housing 12).

Figure 10:
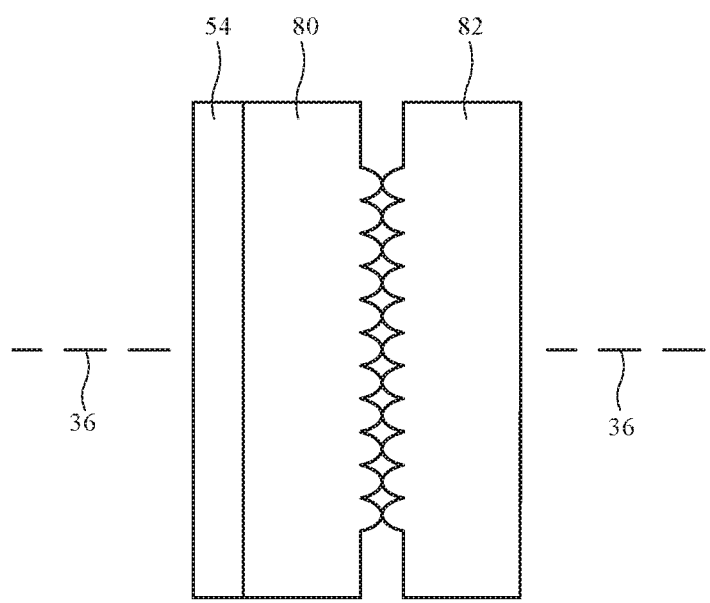
FIG. 10 is a top view of an illustrative electrically adjusted clutch in accordance with an embodiment.

FIG. 10 shows how opposing members such as plates 80 and 82 may be forced towards or away from each other by device 54 in an arrangement in which the direction of motion of plates 80 and 82 relative to each other due to the action of device 54 is parallel to hinge axis 36. In general, any relative motion of opposing structures in hinge 30, any increase or decrease in the stiffness of one or more layers of hinge 30, and/or variation of any other electrically adjustable properties of one or more layers or other structures in hinge 30 may be used in controlling the rotational resistance of hinge 30.

Figure 11:
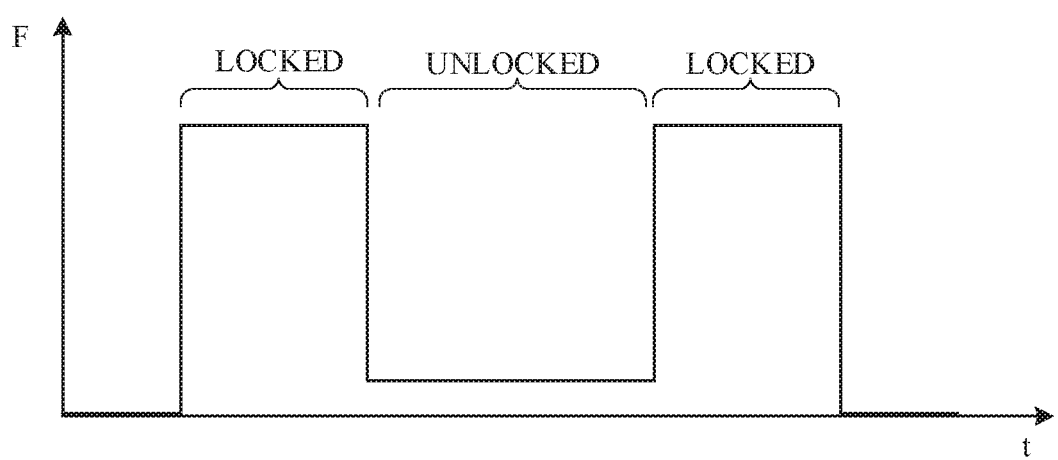
FIG. 11 is a graph showing how the resistance of an electrically adjusted hinge to bending and rotation can be varied in accordance with an embodiment.

FIG. 11 is a graph showing how force F (e.g., rotational friction, required force for bending hinge 30, applied force within hinge 30, etc.) may be varied as a function of time during operation of device 10. When it is desired to help hold housing portion 12A in a desired position (e.g., a desired rotational orientation) relative to housing portion 12B, control circuitry 20 may supply device 54 with signals that increase force F. When it is desired to allow housing portion 12A to move relative to housing portion 12B (e.g., to close or open device 10), force F may be decreased. In this way, the movement of housing portion 12A relative to housing portion 12B may be locked or unlocked. If desired, the value of force F may be varied when hinge 30 is unlocked.

In an illustrative configuration, a soft-close function may be implemented in which housing portion 12A slowly closes onto portion 12B (e.g., under the force of gravity). During this operation, sensor(s) 16 (e.g., an optical encoder, resistive encoder, capacitive sensor, strain gauge, and/or other sensor in or adjacent to hinge 30 that is configured to measure angle A or that is configured to gather other information on the position of housing portions in device 10 relative to each other) may monitor the closing of portion 12A and may, if desired, dynamically adjust the magnitude of force F in real time to ensure that portion 12A is able to close under the force of gravity without abruptly striking portion 12B. These dynamic adjustments to the resistance of hinge 30 to bending may include periods of time in which ending resistance is decreased (e.g., to ensure that gravity is sufficient to close housing 12) and periods of time in which bending resistance is increased (e.g., to slow down a housing portion that is moving too quickly).

Figure 12:
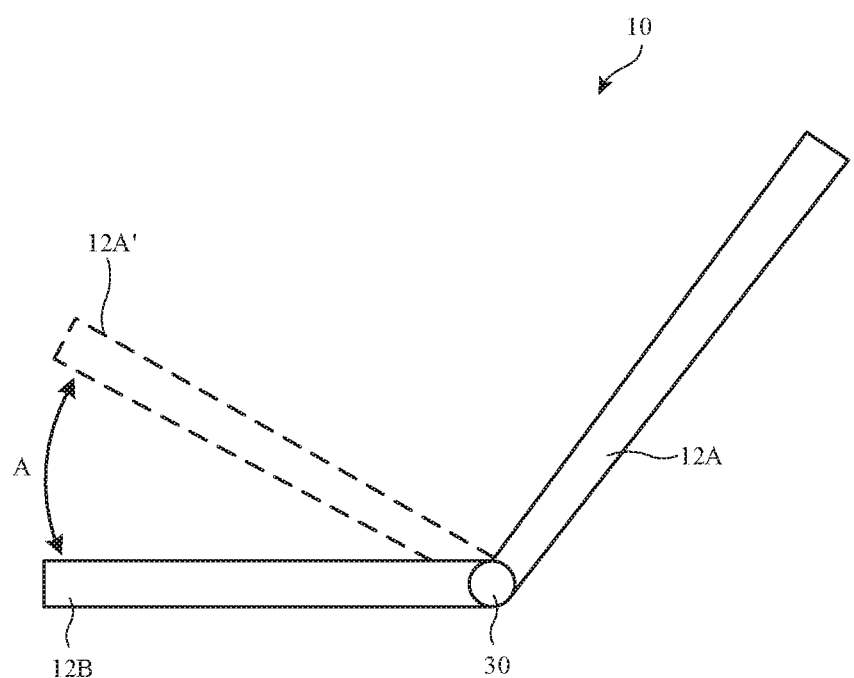
FIG. 12 shows how an electrically adjustable hinge may be used to control the opening and closing of an electronic device housing in accordance with an embodiment.

Control circuitry 20 can adjust the magnitude of force F in response to detection of input such as applied force from a user. For example, one or more sensors 16 (e.g., a strain gauge, proximity sensor, camera, etc.) can detect when a user applies force to housing portion 12A to close housing 12 and/or can detect when a user has applied sufficient force to overcome the resistance of hinge 30 and thereby move housing portion 12A more than a threshold mount (e.g. to detect when the user has moved portion 12A to a position that is more closed than position 12A' of FIG. 12). Immediately upon detecting applied closing force or later, after closing motion has been detected, control circuitry 20 may, if desired, reduce the resistance of hinge 30 to rotational motion to help allow housing portion 12A to freely rotate. If the user stops manually moving portion 12A (e.g. if the user releases portion 12A while portion 12A is in a position such as position 12A' of FIG. 12 or is in a more closed position), control circuitry 20 may, if desired, implement a soft-close operation. For example, a sensor can be used to measure angle A in real time so that device 10 can adjust hinge resistance to allow portion 12A to close onto portion 12B smoothly under the force of gravity.

Figure 13:
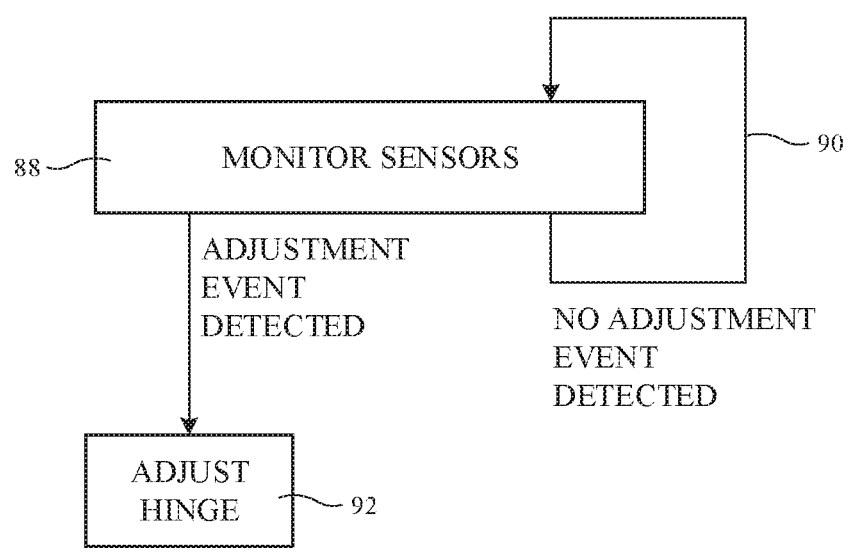
FIG. 13 is a flow chart of illustrative operations involved in controlling operation of an electrically adjustable component such as a hinge in an electronic device in accordance with an embodiment.

Illustrative operations involved in using device 10 are shown in FIG. 13. As described in connection with FIG. 12, one or more sensors 16 may be used to monitor housing portions 12A and 12B (and hinge 30) during the operations of block 88. Sensors 16 such as force sensors, touch sensors, optical sensors, and/or other sensors may, for example, detect when a user touches portion 12A or other portions of housing 12, can measure applied force to rotate portion 12A in an opening direction or closing direction, can measure bending strain (e.g., torque) on hinge 30, can measure the states of adjustable devices 54, can gather manual user input (e.g., voice commands, touch sensor input, keyboard input, fingerprint input, gaze input, etc.), and/or may otherwise gather information from the user, the user's actions on device 10, and/or the environment.

Based on the sensor information gathered during block 88, control circuitry 20 can determine whether an adjustment event that warrants adjustment to the operation of hinge 30 has been detected. Information from sensor(s) 16 may, for example, reveal that a user is reaching for portion 12A, has touched portion 12A, has started to apply force to portion 12A to open or close portion 12A, has placed portion 12A in a desired angular orientation and has held portion 12A at that orientation (within +/−5° or other angular range) for more than a threshold amount of time (e.g., 0.5 s, more than 0.3 s, less than 2 s, etc.), and/or has otherwise signaled an intention to move or stop moving portion 12A. Information from sensors 16 may also reveal that housing portion 12A and/or another portion of housing 12 is exhibiting a characteristic (e.g., closing or opening too fast, slipping from a desired position, etc.), that should be addressed by an adjustment to hinge 30. In the absence of sensor data indicating that the state of hinge 30 should be adjusted, operations can continue during block 88, as indicated by line 90 of FIG. 13. In response to sensing a condition that indicates that hinge 30 should be adjusted, hinge 30 (or other adjustable device(s) in device 10) may be adjusted according during the operations of block 92. For example, force F may be increased or decreased, housing 12 may be locked or unlocked, soft-closing operations may be implemented, etc. Device 10 may make these adjustments to hinge 30 (or other structures in device 10) by adjusting device(s) 54.

Figure 14:
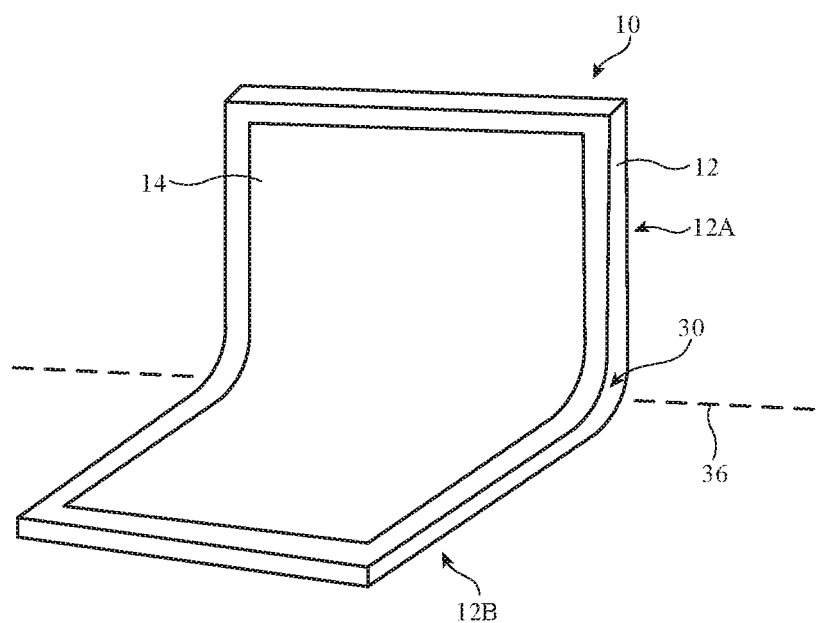
FIG. 14 is a perspective view of an illustrative bendable electronic device such as a device with a bendable display that may be provided with adjustable hinge structures in accordance with an embodiment.

FIG. 14 is a perspective view of device 10 in an illustrative configuration in which housing portions 12A and 12B are part of a unitary housing having a bending portion that forms hinge 30. Display 14 in this type of arrangement may be flexible to allow bending and unbending around hinge axis 36. Hinge 30 may be adjusted to help lock device 10 and housing 12 into a planar shape or in a bent shape and/or to release device 10 and housing 12 from one state to allow a transition into a different state (e.g. to allow device 10 and housing 12 to bend).

Figure 15:
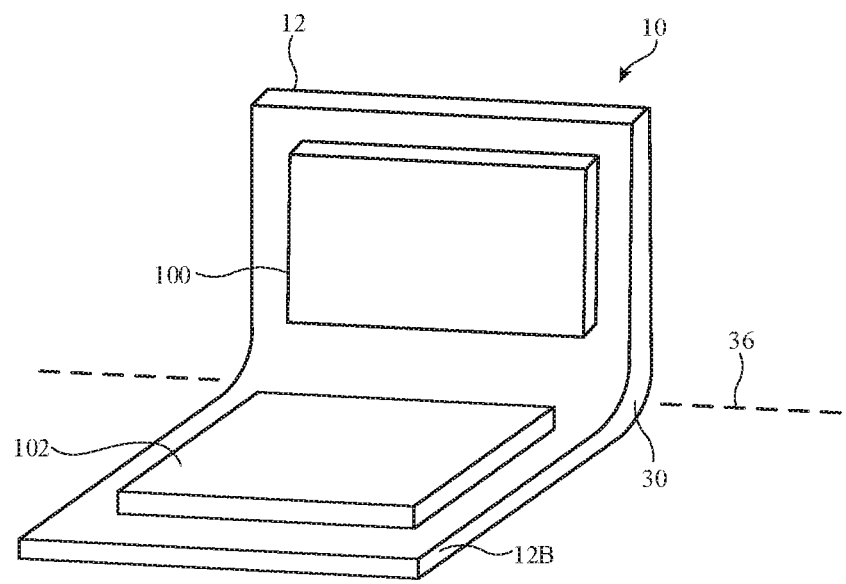
FIG. 15 is a perspective view of an illustrative device such as a foldable case in accordance with an embodiment.

FIG. 15 is a perspective view of device 10 in an illustrative configuration in which device 10 has a housing configured to serve as a case for devices 100 and 102. Housing portions 12B and 12A of housing 12 may, for example, have magnets or other attachment mechanisms for removably coupling to external devices. As an example, the magnets or other attachment mechanisms (snaps or other engagement features, etc.) may be used in receiving and holding removable devices such as devices 100 and 102 in place. Device 100 may be, for example, a removable tablet computer having circuitry of the type shown in FIG. 2 and device 102 may be fixed or removable keyboard, trackpad, and/or other input-output device. Hinge 30 may be adjusted to help hold housing 12 in a desired bent position and/or to allow housing 12 to open or close.

Figure 16:
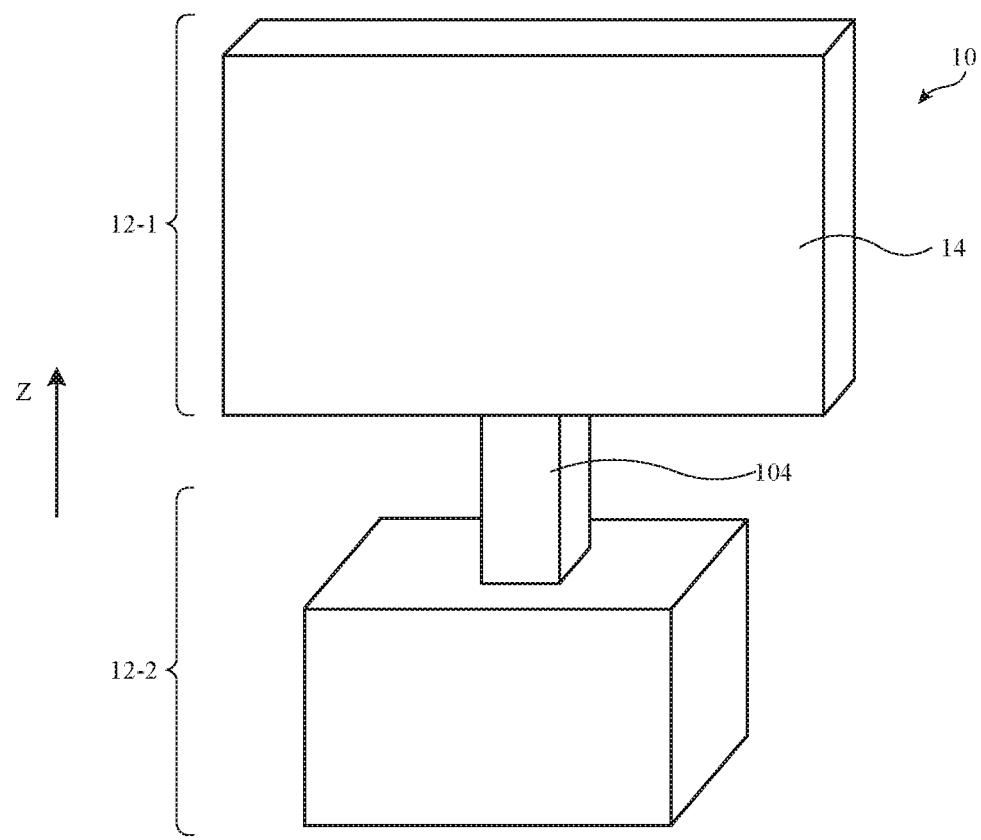
FIG. 16 is a perspective view of an illustrative electronic device that may be provided with an electrically adjustable clutch to control resistance to linear motion between housing portions in accordance with an embodiment.

In the example of FIG. 16, device 10 has an adjustable device such as an adjustable clutch formed from one or more devices 54. The housing of device 10 may have portions that slide relative to each other. Display 14 may, as an example, be mounted in display housing portion 12-1 and display housing portion 12-1 may be slidably coupled to base housing portion 12-2. Support member 104 may slide linearly into and out of base 12-2 to allow a user to adjust the height of display 14. The adjustable clutch in device 10 may be released (sliding resistance may be reduced) to facilitate sliding motion of portions 12-1 and 12-2 relative to each other or may be engaged (sliding resistance may be increased) to help hold portions 12-1 and 12-2 in place relative to each other. Sensor data such as information on the position of a user's hand, movement of a user's hand relative to device 10, force applied by user's hand to increase or decrease the height of display 14, contact between the user's hand and one or more surfaces of device 10, information on the position of portions 12-1 and 12-2 relative to each other, information on the speed of movement of portions 12-1 and 12-2 relative to each other, information on the force applied to raise or lower housing portion 12-1, and/or other sensor data may be used by control circuitry 20 in deciding whether to increase or decrease sliding friction.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is illustrative and various modifications can be made to the described embodiments. The foregoing embodiments may be implemented individually or in any combination.

What is claimed is:

1. An electronic device, comprising:
   control circuitry;
   a housing having first and second portions; and
   a hinge that couples the first and second portions for rotation about a hinge axis, wherein the hinge comprises an electrically adjustable hinge clutch controlled by the control circuitry to adjust resistance of the hinge to bending about the hinge axis.

2. The electronic device defined in claim 1 wherein the hinge comprises an electrically adjustable layer configured to change thickness in response to control signals from the control circuitry to adjust the resistance of the hinge to bending about the hinge axis.

3. The electronic device defined in claim 2 wherein the electrically adjustable layer comprises an electroactive polymer layer.

4. The electronic device defined in claim 3 wherein the hinge comprises first and second flexible layers and wherein the electroactive polymer layer is between the first and second flexible layers.

5. The electronic device defined claim 4 wherein the first and second housing portions and the first flexible layer have a shared housing wall.

6. The electronic device defined in claim 4 wherein the first and second housing portions and the first flexible layer form a first shared housing wall, wherein the first and second housing portions and the second flexible layer form a second shared housing wall, and wherein the first shared housing wall, the electroactive polymer layer, and the second shared housing wall are configured to bend about the hinge axis.

7. The electronic device defined in claim 4 wherein the control circuitry is configured to increase the thickness to increase the resistance of the hinge to bending.

8. The electronic device defined in claim 2 wherein the hinge comprises first and second plates that slide relative to each other as the first housing portion is rotated relative to the second housing portion and wherein the control circuitry is configured to adjust the thickness of the electrically adjustable layer to adjust a force with which the first and second plates press against each other to adjust the resistance of the hinge to bending.

9. The electronic device defined in claim 2 wherein the hinge comprises a flexible layer that overlaps the hinge axis and wherein the flexible layer comprises a sheet of material with flexibility-enhancement openings.

10. The electronic device defined in claim 2 further comprising:
    a display in the first portion; and
    a keyboard in the second portion.

11. An electronic device, comprising:
    control circuitry;
    a sensor;
    a housing having first and second portions; and
    an electrically adjustable hinge that couples the first and second portions together for movement relative to each other about a hinge axis, wherein the control circuitry is configured to adjust the electrically adjustable hinge in response to information gathered with the sensor to adjust resistance of the hinge to bending about the hinge axis.

12. The electronic device defined in claim 11 wherein the electrically adjustable hinge comprises an electroactive polymer layer with an adjustable thickness.

13. The electronic device defined in claim 12 further comprising a flexible display, wherein the flexible display has first and second flexible display portions coupled respectively to the first and second portions of the housing, and wherein the flexible display overlaps the electrically adjustable hinge.

14. The electronic device defined in claim 12 further comprising:
    a display coupled to the first housing portion; and
    a keyboard coupled to the second housing portion.

15. The electronic device defined in claim 12 wherein the first housing portion is configured to removably couple to a device with a display.

16. The electronic device defined in claim 11 wherein the sensor is configured to detect force applied to bend the hinge about the hinge axis.

17. The electronic device defined in claim 11 wherein the control circuitry is configured to adjust the resistance of the hinge to bending about the hinge axis dynamically to as the first portion moves toward the second portion to close the housing.

18. An electronic device comprising:
    a sensor configured to gather sensor data;
    a housing having first and second portions;
    first and second layers configured to slide relative to each other as the first and second portions move relative to each other;
    an electrically adjustable layer configured to change thickness to control a force with which the first and second layers bear against each other and thereby adjust sliding friction between the first and second layers; and
    control circuitry configured to control the electrically adjustable layer in response to the sensor data.

19. The electronic device defined in claim 18 further comprising a display mounted in the first housing portion.

20. The electronic device defined in claim 19 wherein the electrically adjustable layer comprises an electroactive polymer layer.

* * * * *